(No Model.)
2 Sheets—Sheet 1.
C. J. PULLEN.
CARRIAGE RUNNING GEAR.
No. 320,000. Patented June 16, 1885.
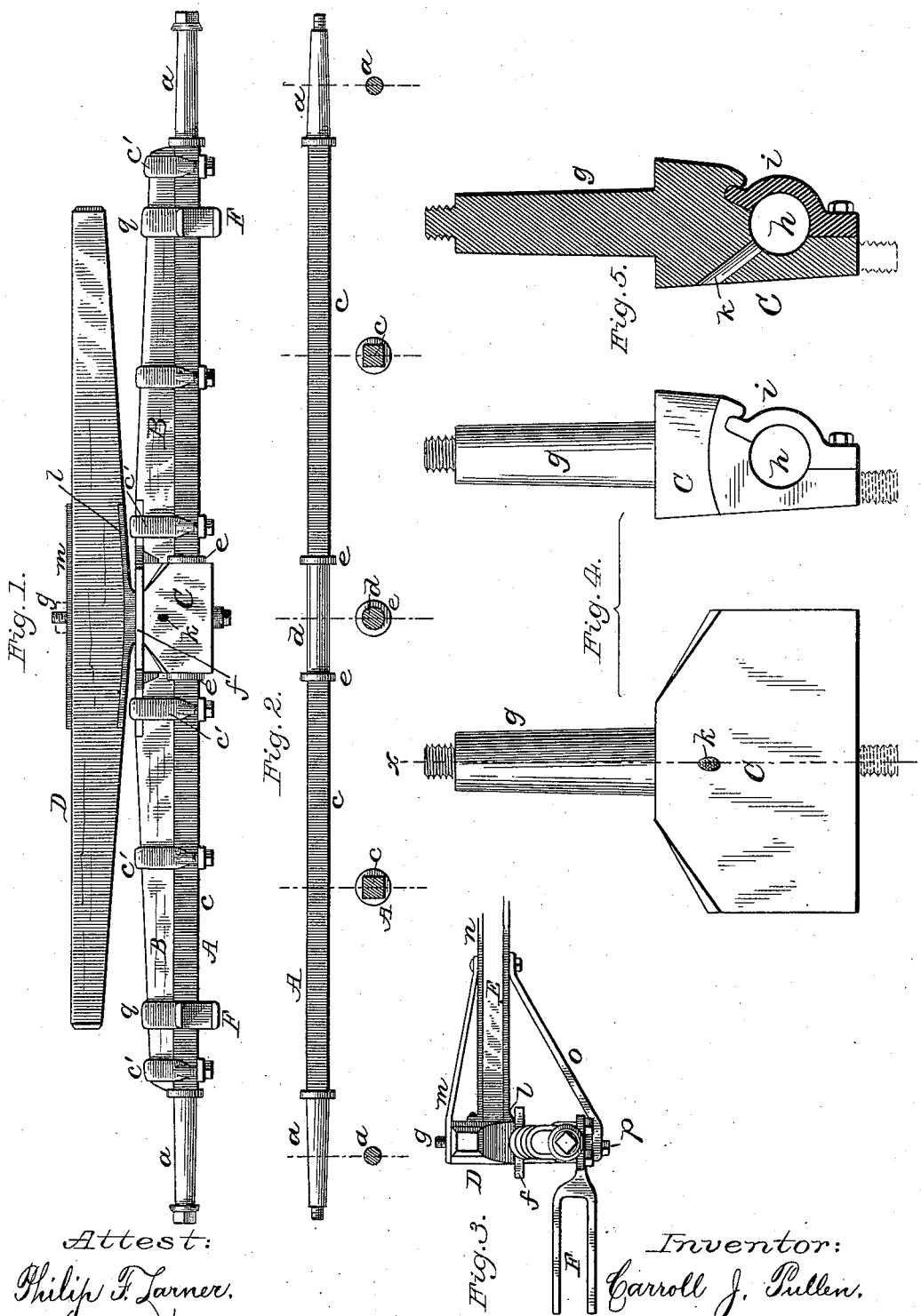
Attest:
Philip F. Larner.
Lowell Battle
Inventor:
Carroll J. Pullen.
By Wm C. Wood
Attorney.

(No Model.) 2 Sheets—Sheet 2.
C. J. PULLEN.
CARRIAGE RUNNING GEAR.
No. 320,000. Patented June 16, 1885.
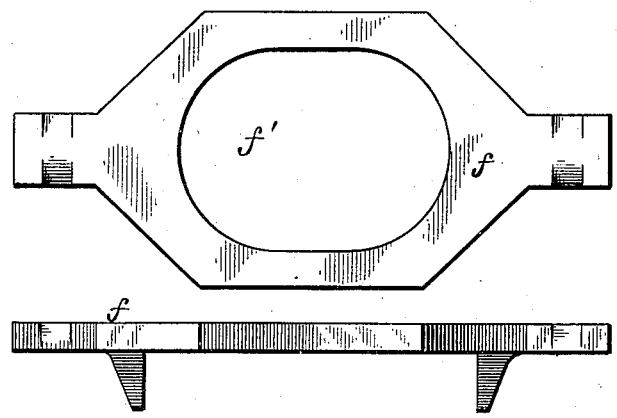
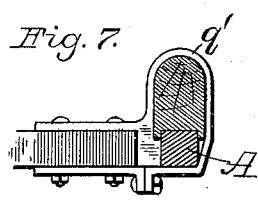
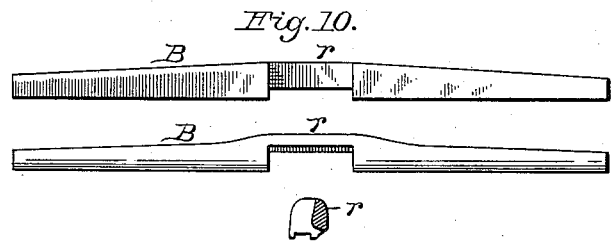
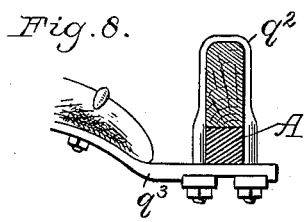
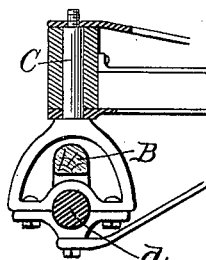
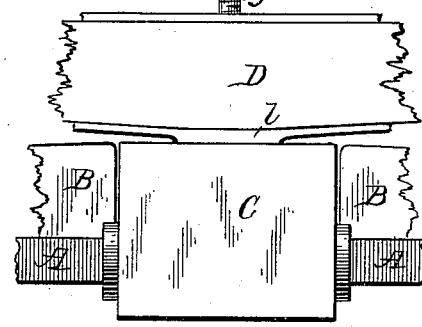
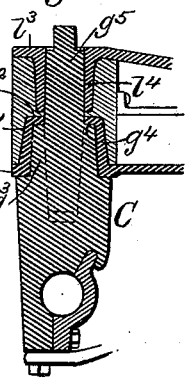
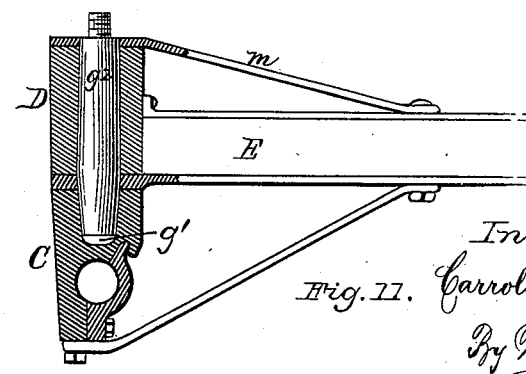
Attest:
Philip F. Larner.
Nowell Bartle.
Inventor:
Carroll J. Pullen.
By McMurd
Attorney.
N. PETERS, Photo-Lithographer, Washington, D. C.

UNITED STATES PATENT OFFICE.

CARROLL J. PULLEN, OF PAWTUCKET, RHODE ISLAND.

CARRIAGE RUNNING-GEAR.

SPECIFICATION forming part of Letters Patent No. 320,000, dated June 16, 1885.

Application filed April 10, 1885. (No model.)

*To all whom it may concern:*

Be it known that I, CARROLL J. PULLEN, of Pawtucket, in the county of Providence and State of Rhode Island, have invented certain new and useful Improvements in Carriage Running-Gear; and I do hereby declare that the following specification, taken in connection with the drawings furnished and forming a part thereof, is a clear, true, and complete description of the several features of my invention.

My said improvements relate to carriage-axles, and to the parts with which they are directly connected.

The object of one portion of my invention is to provide for obtaining uniform wear of the bearing-surface between the hub or its box and the axle-journal, and to that end one portion of my invention includes a rotatively adjustable axle and its wood stock, the two being so constructed and combined that all portions of the journals may be from time to time successively presented for wear, thus obviating the heretofore well-known tendency to undue wear at the under side of each journal. This portion of my invention is applicable to both axles of four-wheeled vehicles; but other portions of my invention are applicable only to the axle to which a pole or thills are attached, whether it be the single axle of a two-wheeled vehicle or the front axle of a four-wheeled carriage. In this last connection one object of my invention is to obviate pivotal connections of an axle with its pole or its thills, and, further, to obviate fifth-wheels or segmental plates between the axle and front rocker; and, further, to provide for an increased durability of the axle and the king-bolt, and for a peculiar flexibility as between said bolt, the rocker, and the axle, whereby the changes in position of these parts incident to use will be made smoothly and with a minimum of friction. To these ends I have provided the front axle with a central journal, preferably concentric with the axial line of the axle, and employ therewith a king-bolt block and a king-bolt, which may be integral with said block or entered therein or rigidly projecting therefrom, said block having a tubular bearing, within which said central journal is housed. I have also constructed said block in sections, whereby it may be readily mounted upon or detached from said journal, and I have provided the bearing chamber or box of said king-bolt block with one or more pockets, which I can fill with graphite to operate as a dry lubricant, and thus obviate the adhesion of dust and dirt to the adjacent parts.

To more particularly describe my invention, I will refer to the accompanying drawings, and after describing the same the features deemed novel will be specified in the several clauses of claim hereunto annexed.

Figure 1 is a front view of a front rocker and a front axle, all in accordance with my invention. Fig. 2 illustrates the metal axle detached in front view and also in several sections. Fig. 3 is an end view of the parts shown in Fig. 1, with the forward end of a perch, its irons, and braces. Fig. 4, in front and end views, illustrates the king-bolt block detached and in its most approved form. Fig. 5 is a vertical cross-section of the same on line X. Fig. 6, in two views, illustrates a detached metal bridge-brace by which the two portions of the axle-wood stock are coupled adjacent to the king-bolt block for securing the proper strengthening effect of the wood stock. Figs. 7 and 8 are views illustrating modes of rigidly connecting the thills or a pole to the wood stock and axle. Fig. 9 is a sectional view illustrating a modification of the king-bolt block, by the use of which a continuous length of wood stock may be employed. Fig. 10, in front, top, and sectional views, illustrates a wood stock in one piece for use with a solid king-bolt block. Fig. 11 is a sectional view of a king-bolt block and a detachable king-bolt, as combined with the rocker, perch, and top brace. Figs. 12 and 13, in front view and in cross-section, respectively, illustrate one form of my king-bolt block and bolt as organized for heavy service.

The axle A is preferably straight, and its two hub journals, *a*, are each truly concentric to the same axial line. If it be a rear axle its sectional area between the journals *a* is rectangular, and has preferably four equal sides, although approximately desirable results will accrue if the axle be flattened. The wood stock B is channeled or grooved on its under side to receive therein the square portion of the body c of the axle, and it is secured to the axle by means of clamping-clips c' of any of the well-known forms. If it be a rear axle the wood stock always extends in one piece from one journal to the other.

As thus far described my invention is involved in the combination with a wood stock of an axle which can be connected to said wood stock in any one of two, three, or four rotative positions of adjustment, and thus enable the journals a to be readjusted from time to time for presenting a new bearing-surface for contact with a hub or its box, and thus obviate any undue wear at any one side of said journals.

I have stated that my axle is preferably straight, and by this I intend to have it understood that said axle may be slightly arched without departure from this portion of my invention, because such an axle could be rotatively adjusted in its wood stock after the manner of the straight axle, but would only involve such slight reverse bending of the axle in line with any one of its flat sides at c as would be obviously essential to its new position. I have also stated that the wood stock is grooved or channeled to receive the axle; but, for instance, if the body of the axle be flattened and not square good results will accrue if no groove be employed, although it is obvious that a more desirable finish will result from the use of the groove or channel.

In the drawings a front axle only is illustrated, the differences between it and a rear axle being so readily understood that a special illustration of the latter is deemed unnecessary. In this front axle a central journal, d, is formed, and this I believe to be an entirely novel feature. This journal is concentric with the axis of the axle and of the journals a, especially if the axle be straight, and substantially so if the axle be slightly arched, as hereinbefore indicated; but in this latter case said journal d should not be arched or curved, but be practically straight. At each end of this central journal there is an integral collar, e. The wood stock B on this axle is as before described, except that it is made in two parts, each extending from its respective wheel-journal a to a collar, e. In some cases, although the wood stock is thus non-continuous, it can be relied upon for affording sufficient strength, as in certain light vehicles; but for obtaining the best results the two pieces should be so coupled or braced at their coincident ends as to enable them to operate substantially as if in one piece. This coupling effect may be produced in various ways without departure from certain portions of my invention; but I have devised a special bridge-brace, f, which is composed of cast or of wrought metal, and is interposed between the inner ends of the two pieces of wood stock and affords a favorable abutment for each, and provides for the favorable resistance of deflecting strains. This bridge-brace may be bolted to the wood stock and axle through and through; or, as I prefer, the whole may be locked together by the clamping-clips c', as shown in Fig. 1. This bridge-brace is formed on top at each of its ends to conform to the adjacent portions of the wood stock; but at its middle or main portion it is much wider than the thickness of the wood stock, so as to afford a central space, f', and freely surround the king-bolt block C in a substantially horizontal plane. The king-bolt block C has a king-bolt, g, rigidly connected therewith, and they are preferably integral, although the bolt may be separately constructed and firmly and rigidly attached to the block—as by screw-threads, or by a tapered bolt and hole, or by other well-known means—without departure from my invention. This block has a journal-box, h, which is fitted to the central axle-journal d, and it has a detachable cap, i, secured in place by bolts, to enable the block to be readily mounted on and detached from said journal. The collars e and the coincident ends of the block C are closely fitted to each other, so as to permit the block to freely vibrate on the journal, but properly confine it against longitudinal movement. In its best form the cap i at its upper edge occupies a recess or groove in the block, thus requiring bolts only at its lower side. At the rear side of the block a tubular pocket, k, is formed, extending from the exterior of the block to the journal-box within, and this is solidly filled with graphite, which can from time to time be forced inwardly, so that a sufficient quantity thereof will be taken up by the journal and box to serve as a dry lubricant. Should the graphite be exhausted, and a new supply be not available, other well-known solid or even liquid lubricants can readily be applied by way of the pocket, to which a plug should be fitted for excluding dirt. But one pocket is shown, and more than one can be employed, if desirable.

I am aware that graphite has been employed in connection with journals of various kinds; and it is to be distinctly understood that I make no claim thereto, but limit this portion of my invention to the king-bolt block mounted upon a journal on an axle, and provided with a pocket adapted to the storage of a dry or solid lubricant for said journal for obviating objectionable collections of dirt and grease. The king-bolt g passes upward through a suitable hole in the rocker D, provided with a T-plate, l, on its under side, which affords a bearing-face for contact with the top or bearing face of the block, surrounding the base of the king-bolt, and said plate l has its tang extended rearward beneath the perch E, to which it is bolted. The upper end of the king-bolt g is threaded, and passes through a strap-plate, and also through the front end of an upper brace, m, and it is secured by a nut thereto, and the rear end of said brace m extends rearward over the perch, and is bolted thereto upon an interposed plate, n, which abuts at its front end against the rear side of the rocker. At the lower side of the block it is coupled by the under brace, o, to the under side of the perch. This brace may be coupled to the block by means of a bolt, p, tapped into a hole in the block; or a bolt may be formed integrally on the block (as with the king-bolt) and threaded to receive a nut. It will be seen that all the parts described are well secured and braced without in any manner impairing that freedom of movement which is requisite between the rocker and axle, and also between the block and its journal.

With the axle and king-bolt block as thus described, a pole or thills may be employed, as heretofore, without departure from certain portions of my invention; but certain other portions of my invention involve the rigid or non-flexible or non-pivoted union of the pole or the thills, as the case may be, with the axle, so that when the thills are raised and lowered at their outer ends the axle will be partially rotated in the wheel-hubs and in the king-bolt block. Under this portion of my invention I seek to obviate the noise due to the use of pivoted clips or thill-bolts, and also to lessen the danger of accidents due to the well-known tendency of thill-bolts to work loose. The thills F are each provided with a clamp-clip, $q$, rigidly bolted to the thill, and also rigidly clamped upon the axle and its wood stock. This thill clamp clip may be variously constructed without departure from my invention. In Fig. 7 I show said clip composed of a yoke, $q'$, which wholly embraces the wood stock and axle, and in Fig. 8 the yoke $q^2$ embraces the top and two sides of the axle and wood stock, and has threaded bolt-ends and nuts, by which a rigid connection is made with the rear end of a plate, $q^3$, which is bolted to the thill.

It is not to be understood that a king bolt block journaled on the axle in accordance with certain portions of my invention necessarily involves the construction of the wood stock in two parts, but only involves a change in the construction and form of said block, if a continuous wood stock is desired—as, for instance, in Fig. 9 the axle-journal $d$ is shown in cross-section, and a wood stock, B, in one length, is also shown in similar section, but cut away to afford requisite space between its under side and said journal. In this case the king-bolt block C is skeletonized, so as to loosely embrace the wood stock and yet have its bearing upon said axle-journal, and a cap-plate bolted to its under side, as clearly shown, thus providing for substantially similar results as those accruing from the use of the block when constructed as before described. Although this peculiar form of king-bolt block is of value, I prefer the solid block and the wood stock in two parts, coupled by the bridge-brace. If the solid bolt-block be desired without a metal bridge-brace, the wood stock can be constructed in one piece by making it thicker at its center than at either side, and mortising it in front to accommodate the bolt-block, as illustrated in Fig. 10, and in which the portion $r$ of the wood stock back of the recess serves as a bridge or connection for the main portions of the wood stock at each side of the journal at the middle of the axle.

Although I have stated that I prefer the king-bolt to be rigidly attached to the block, the latter may be used to advantage with a king-bolt, which can be lifted from its seat in the usual manner. In Fig. 11 the rocker D, perch E, and brace $m$ are as before described. The block C has a bolt-hole, $g'$, into which the king-bolt $g^2$ is entered by passing it downward through the rocker.

In the use of my king-bolt block, it will be seen that I obviate weakening the axle, heretofore incident to perforating it for the passage of the king-bolt, it being evident that all the weight borne by a front axle is concentrated by the rocker directly over the center of the axle, and it is obvious that my central journal can be made of any size and length within reason. The extent of rotative movement of the axle can be obviously limited, either by the width of the slot in the bridge-brace or by the space afforded between the wooden bridge $r$ of Fig. 10 and the rear side of the block; or by the front and rear spaces between the wood stock and the block, as in Fig. 9, and thus a pole or thills, when not in service, can be arranged to rest at their tips more or less lightly on the ground, or be wholly raised therefrom.

For specially heavy service, requiring an unusually strong king-bolt, the latter is preferably constructed with a large base, $g^3$, a bearing-shoulder, $g^4$, and a smaller stem, $g^5$, all integral with the block C, as shown in Figs. 12 and 13, wherein the rocker D has at its under side a T-plate, $l$, provided with a vertical integral sleeve, $l'$, which houses the base $g^3$ of the bolt, and at its upper end said sleeve is inwardly flanged at $l^2$, to afford a bearing on the bolt-shoulder $g^4$, which is protected against the introduction of dust and dirt. A strap-plate, $l^3$, on top of the rocker is provided with an integral pendent tubular sleeve, $l^4$, which is occupied by the stem $g^5$ of the king-bolt. With this construction it is obvious that great strength is afforded, and that the frictional contact of the rocker with the king-bolt and its block can be distributed between the two bearing-surfaces, the one at the base of the bolt on the block and the other at the shoulder on the bolt. These results will not depend upon a king-bolt wholly integral with the block, it being obvious that the base $g^3$ need only be integral therewith, and that the stem $g^5$ may be separately constructed and inserted into a hole in said base and block, as indicated in dotted lines. As here shown, the block lengthwise practically fills the space between the inner ends of the two pieces of the wood stock, and although no bridge-brace is here shown it is obvious that it can be applied as before described.

Having thus described my invention, I claim as new and desire to secure by Letters Patent—

1. The combination of a metal axle having a body substantially rectangular in cross section, and also wheel-journals, substantially concentric with the axial line of the axle, and a wood stock fitted on its upper side to receive the body of the axle in two or more different positions resulting from its rotative adjustment, and clamping devices for uniting said wood stock and axle, the whole organized to admit of the rotative adjustment of the axle with relation to the wood stock, substantially as described, whereby the axle may from time to time be partially rotated on its axis and reset in the wood stock for presenting new bearing-surfaces at the under sides of its journals, as set forth.

2. The combination, substantially as hereinbefore described, of an axle having a centrally-located journal, and a king-bolt block mounted on said journal.

3. The combination, substantially as hereinbefore described, of an axle having a journal centrally located thereon, a king-bolt block mounted upon said journal, and a king-bolt projecting from said block.

4. The combination, substantially as hereinbefore described, of an axle having a centrally-located journal, a king-bolt block mounted on said journal, a wood stock for said axle constructed in two parts, each extending from said journal outwardly, and a slotted bridge-brace loosely surrounding said block and coupling the parts of the wood stock above said journal.

5. The combination, with an axle having a central journal, of a king-bolt block mounted on said journal and provided with an internal pocket for the storage of a solid lubricant, substantially as described.

6. The combination of the axle having a central journal, a king-bolt and its block mounted on said journal, a rocker, a perch, and a brace coupling the top of said king-bolt to the perch, substantially as described.

7. The combination of the axle having a central journal, a king-bolt and its block mounted on said journal, a rocker, a perch, and a brace coupling the bottom of said block to the perch, substantially as described.

8. The combination of the wood stock, the axle having a central journal, a king-bolt block mounted on said journal, and a pole or thills rigidly coupled to said axle and wood stock, substantially as described.

CARROLL J. PULLEN.

Witnesses:
DANIEL MCNIVEN,
F. LEONARD.